United States Patent [19]
Onan et al.

[11] Patent Number: 5,483,986
[45] Date of Patent: Jan. 16, 1996

[54] METHOD OF DISPLACING LIQUIDS THROUGH PIPES

[75] Inventors: David D. Onan, Lawton; Vincent J. Bila, Duncan; James L. Haney, Duncan; Gary E. Folmnsbee, Duncan; Ronney R. Koch, Duncan, all of Okla.; Randall D. Stilley, London, United Kingdom; Larry T. Watters, Duncan, Okla.

[73] Assignee: Halliburton Company, Duncan, Okla.

[21] Appl. No.: 255,633

[22] Filed: Jun. 9, 1994

Related U.S. Application Data

[62] Division of Ser. No. 41,083, Apr. 1, 1993, Pat. No. 5,346,011.

[51] Int. Cl.⁶ .............................. F16K 13/10; E21B 33/16
[52] U.S. Cl. ........................... 137/1; 137/251.1; 137/807; 507/200
[58] Field of Search ................................. 137/251.1, 807, 137/1; 166/285; 507/200

[56] References Cited

U.S. PATENT DOCUMENTS

| | | |
|---|---|---|
| 2,219,325 | 10/1940 | Maness . |
| 3,056,156 | 10/1962 | Immel . |
| 3,749,173 | 7/1973 | Hill et al. . |
| 3,863,718 | 2/1975 | Bruist . |
| 3,866,683 | 2/1975 | Maly et al. . |
| 3,878,895 | 4/1975 | Wieland et al. . |
| 3,926,258 | 12/1975 | Hessert et al. ............................ 166/294 |
| 4,083,407 | 4/1978 | Griffin, Jr. et al. . |
| 4,304,300 | 12/1981 | Watson . |
| 4,378,049 | 3/1983 | Hsu et al. . |
| 4,461,352 | 7/1984 | Falk ......................................... 166/295 |
| 4,646,834 | 3/1987 | Bannister . |
| 4,649,999 | 3/1987 | Sandy et al. . |
| 4,819,727 | 4/1989 | Jennings, Jr. . |
| 5,027,900 | 7/1991 | Wilson ..................................... 166/285 |
| 5,159,980 | 11/1992 | Onan et al. . |

*Primary Examiner*—A. Michael Chambers
*Assistant Examiner*—Kevin L. Lee
*Attorney, Agent, or Firm*—Craig W. Roddy; Robert A. Kent

[57] ABSTRACT

Improved methods of displacing a first liquid through a pipe with a second liquid while preventing the first and second liquids from mixing are provided. In accordance with the methods, a plug is formed in-situ in the pipe between the first and second liquids by injecting a self-thickening liquid therein and permitting the liquid to thicken. The formed plug and the first liquid are then displaced through the pipe with the second liquid. The methods are particularly suitable for carrying out subterranean well bore cementing operations wherein cement slurries are displaced through pipes disposed in well bores.

13 Claims, 2 Drawing Sheets

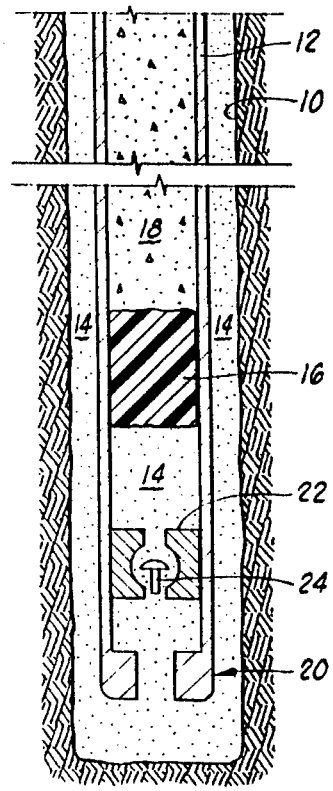
Fig. 1
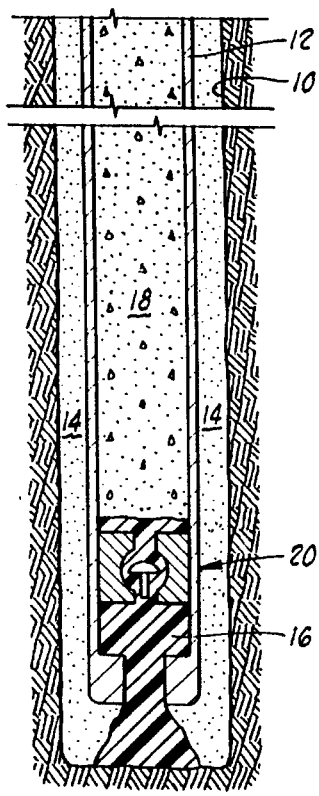
Fig. 2
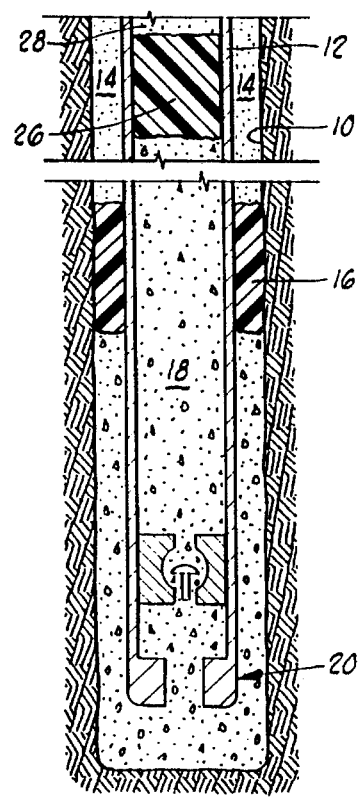
Fig. 3
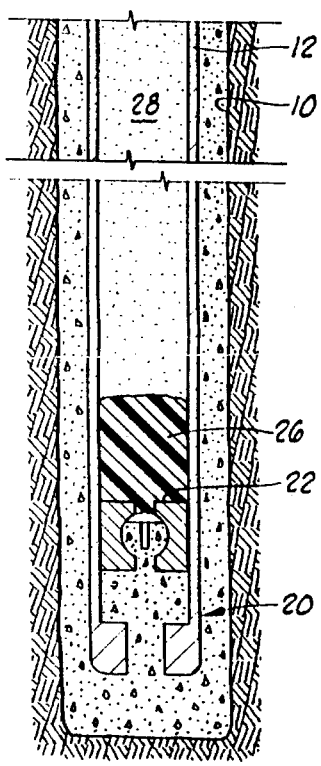
Fig. 4
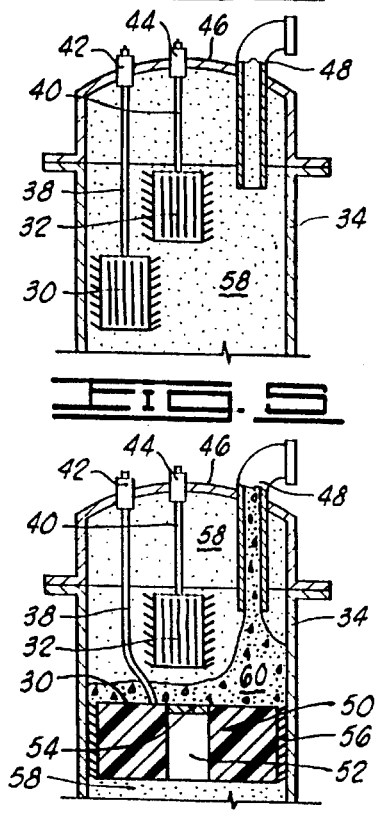
Fig. 5
Fig. 6
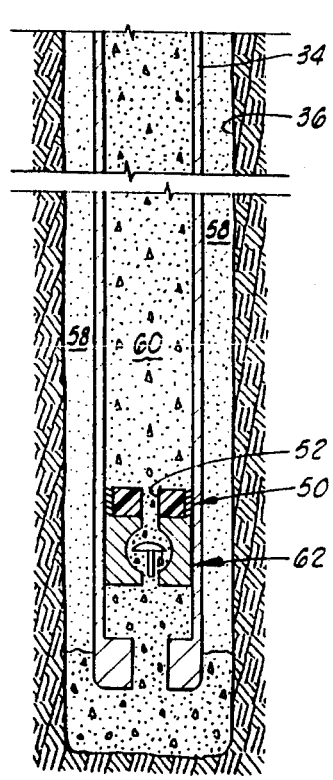
Fig. 7

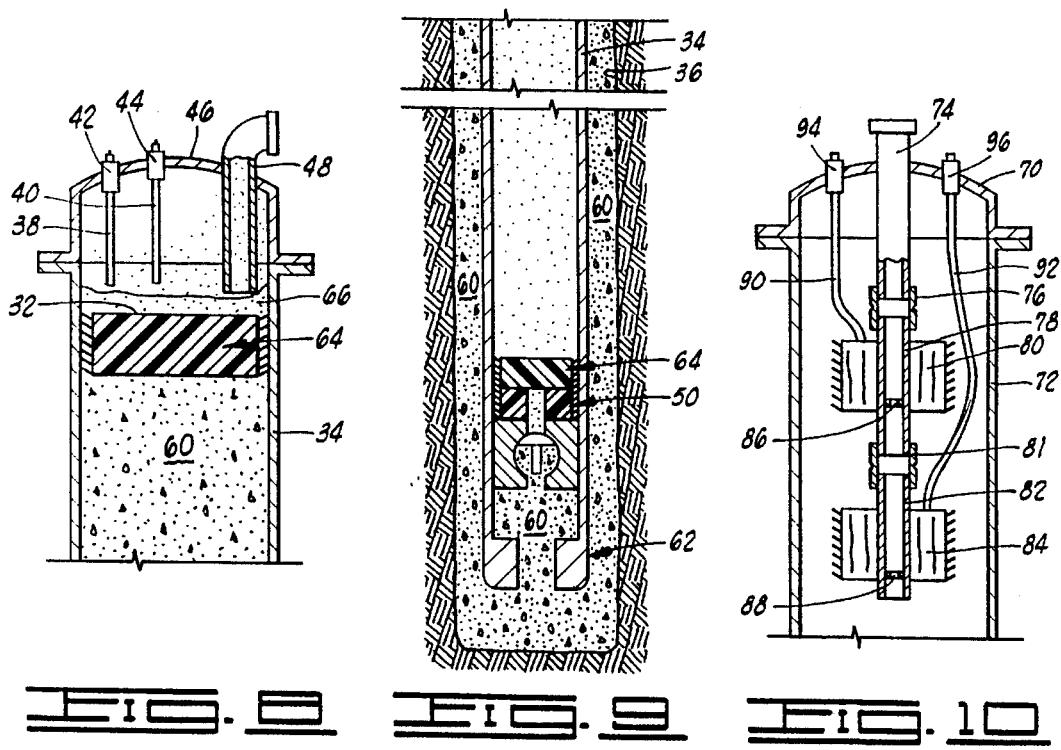
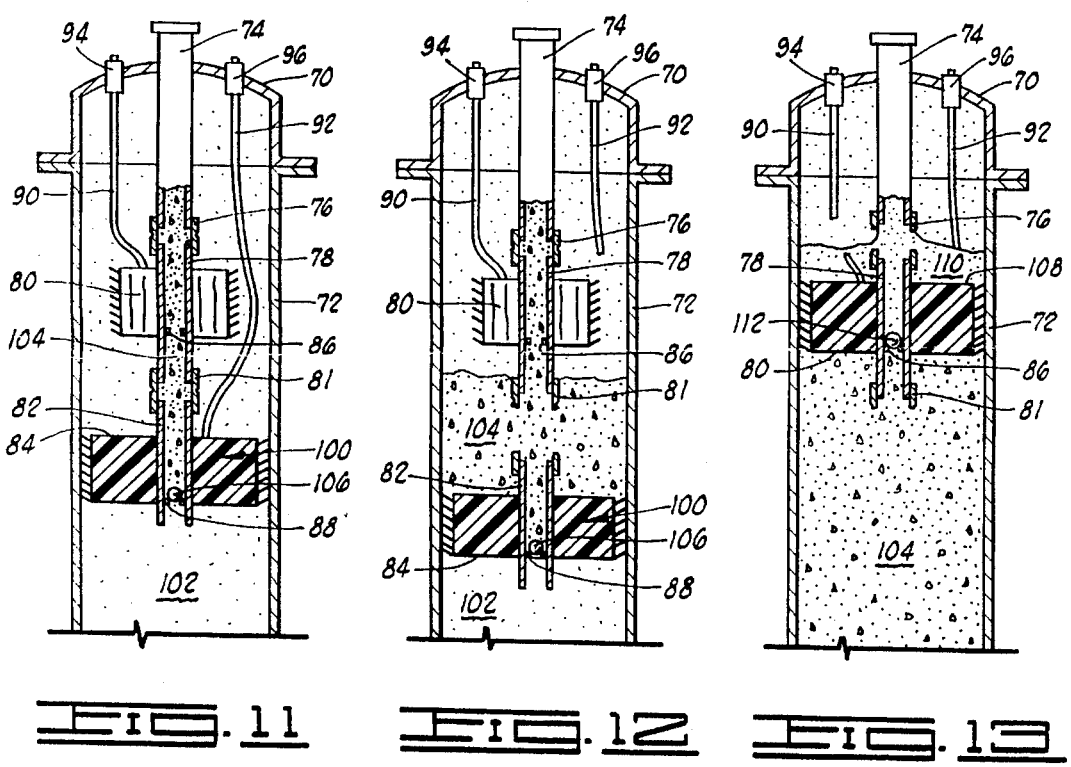

METHOD OF DISPLACING LIQUIDS THROUGH PIPES

This application is a division of application Ser. No. 08/041,083, filed Apr. 1, 1993, U.S. Pat. No. 5,346,011.

BACKGROUND OF THE INVENTION

1. Field of the Invention

The present invention relates generally to improved methods of displacing liquids through pipes, and more particularly, to improved methods of cementing pipe, such as casing, in a well bore.

2. Description of the Prior Art

A fluid of a particular type, composition, viscosity and/or other physical properties is frequently displaced through a pipe by a second fluid of a different type, composition, viscosity or other property. For example, underground pipelines for conducting fluids, such as hydrocarbons, e.g., oil or gas, aqueous solutions, aqueous dispersions and the like from one location to another, are commonly utilized throughout the world. Very often, it is necessary to displace a first fluid through a pipeline by a second fluid without mixing the two fluids. This has heretofore been accomplished by physically inserting a resilient plug or ball between the two fluids. The plug functions to separate the fluids, prevent them from being mixed and also to wipe the walls of the pipe and remove residue therefrom as the first fluid is displaced through the pipe by the second fluid.

Fluid-separating plugs are frequently utilized in pipelines and in the construction and repair of oil and gas wells. For example, primary cementing, a principal well construction technique, involves the placement of a hydraulic cement slurry in the annulus between the walls of a subterranean well bore and a pipe, e.g., casing, disposed therein. The cement slurry is allowed to set in the annulus whereby the exterior surfaces of the pipe are bonded to the walls of the well bore. This bonding of the pipe within the well bore serves to maintain the pipe in place and to prevent formation fluids from communicating between subterranean formations or zones or to the surface by way of the annulus.

The performance of a primary cementing operation is generally conducted after a well bore has been drilled to the depth to which casing is to be set. The pipe to be cemented in the well bore is suspended in the well bore which is filled with liquid drilling fluid used in the drilling operation, whereby both the pipe and the well bore contain liquid drilling fluid. A hydraulic cement slurry is pumped downwardly within the pipe whereby the cement slurry displaces the drilling fluid within the pipe into the annulus and drilling fluid in the annulus out of the well bore at the surface. When the required volume of cement slurry has been pumped into the pipe, a displacement fluid such as an aqueous solution is utilized to displace the cement slurry into the annulus. That is, the displacement fluid is pumped downwardly within the interior of the pipe in a volume such that the cement slurry in the pipe is displaced into the annulus.

In order to prevent the cement slurry used in primary cementing from mixing with and being contaminated by drilling fluid and the displacement fluid utilized, resilient separating plugs have heretofore been utilized. That is, the bottom of the pipe to be cemented in the well bore usually has a flow control device, such as a float shoe, connected thereto which contains a check valve for allowing fluids to flow out of the pipe and into the annulus but prevents backflow from the annulus into the pipe. Such float shoes are well known to those skilled in the art and they generally include an upwardly facing seating surface. A resilient plug, known as a bottom plug, formed of a rubber or plastic material is inserted at the top of the pipe between the drilling fluid contained therein and the cement slurry to be pumped into the annulus. The cement slurry is pumped into the pipe which displaces the bottom plug and the drilling fluid downwardly through the pipe and through the check valve in the float shoe until the plug contacts the seating surface of the float shoe. The plug functions to separate the cement slurry from the drilling fluid and to wipe drilling fluid from the walls of the pipe as it is displaced therethrough. While various techniques have been utilized for allowing the cement slurry to flow through or around the bottom plug when the cement slurry is displaced into the annulus, a common technique is to include a rupturable member across a passageway extending through the plug whereby when the plug is seated on the float shoe and the pressure against the plug is increased, the rupturable member ruptures which allows the cement slurry to flow through the passageway in the plug, through the float shoe and into the annulus.

When the required quantity of cement slurry is pumped into the pipe the pumping of the cement slurry is stopped and a second plug, known as a top plug, is placed between the cement slurry and a displacement fluid to be pumped into the pipe. The displacement fluid is next pumped into the pipe whereby the top plug and the cement slurry are displaced downwardly and the cement slurry is displaced into the annulus. The displacement fluid is pumped until the top plug above the cement slurry contacts the bottom plug seated on the float shoe. When that happens, the required volume of cement slurry has been displaced into the annulus and the cement slurry is allowed to set therein. After the cement slurry has set, the plugs and the float shoe are drilled out, and further drilling and well completion operations are commenced.

Heretofore, the physical placement of the resilient plugs in the pipe has been accomplished using a plug container which is connected to the pipe and includes relatively complex plug releasing devices. Such containers are difficult to install and load, and in performing primary well cementing operations using plugs, a plug container operator is often required to work above the drilling rig floor suspended from a line connected to the drilling rig. In addition, since a positive indication of the release of a plug is required, pumping of the cement slurry or displacement fluid must often be interrupted for a relatively long period of time while the plug is released or while an additional plug is loaded into the plug container. Thus, there is a need for an improved method of providing fluid separating plugs within pipes in well cementing and similar operations. Also, as mentioned above, in the operation of pipelines fluid separation and pipeline cleaning is accomplished by inserting a plug, sometimes referred to as a pig, in the pipeline. The placement of such a plug has heretofore required the use of special plug containment loops, valves and the like. Thus, there is also a need for improved methods of providing plugs in pipelines and other similar operations.

SUMMARY OF THE INVENTION

The present invention provides improved methods of displacing fluids through pipes which meet the needs described above and overcome the shortcomings of the prior art. The improved methods basically comprise forming at least one plug in-situ in a pipe between first and second bodies of fluid therein by injecting a self-thickening liquid in the pipe and permitting the liquid to thicken into a fluid-separating plug prior to displacing the plug and the first body of fluid with the second fluid.

The self-thickening liquid can be comprised of a solution or dispersion of a natural or synthetic hydratable polymer and a cross-linking agent therefor which thickens after being injected into a pipe as the result of the polymer being hydrated and then cross-linked by the cross-linking agent. An example of such a self-thickening liquid is an aqueous solution of a polysaccharide polymer and a cross-linking agent selected from the group consisting of water soluble organo-metallic compounds, borate compounds and compounds containing polyvalent metals. The self-thickening liquid can also be comprised of a suspension of a natural or synthetic rubber and a vulcanizing agent therefore which thickens after being injected into the pipe as a result of the rubber being vulcanized by the vulcanizing agent.

In another aspect of the present invention, one or more inflatable bladders are placed in a pipe in a manner which allows them to be selectively inflated from outside the pipe and allows the flow of fluids through the pipe when the bladders are uninflated. The bladders form fluid-separating plugs in the pipe when they are inflated. While various inflating fluids can be utilized to inflate the bladders, a preferred inflating fluid is a self-thickening liquid of the type described above.

In yet another aspect of the present invention, methods of cementing a pipe suspended in a subterranean well bore filled with drilling fluid are provided wherein fluid-separating plugs are formed in-situ in the pipe between a drilling fluid and cement slurry therein and between the cement slurry and a displacement fluid therein. The fluid-separating plug between the drilling fluid and the cement slurry is formed of a self-thickening liquid comprised of an aqueous solution of a natural or synthetic hydratable polymer and a cross-linking agent. Such a plug can be extruded through the float shoe at the bottom of the pipe to thereby eliminate the need for a rupturable diaphragm or other means for providing passage of the cement slurry through or around the plug. The fluid-separating plug between the cement slurry and the displacement fluid is preferably formed of a self-thickening liquid comprised of a natural or synthetic rubber and a vulcanizing agent. When the rubber is vulcanized by the vulcanizing agent within the pipe, it forms a resilient solid plug which will not extrude through the float shoe and upon seating on the float shoe causes a pressure increase which signals that displacement is complete.

It is, therefore, a general object of the present invention to provide improved methods of displacing fluids through pipes.

A further object of the present invention is the provision of methods of displacing fluids through pipes whereby fluid-separating plugs are simply and easily formed in-situ within the pipes.

Yet a further object of the present invention is the provision of improved methods of cementing pipes in subterranean well bores wherein fluid-separating plugs are quickly and easily formed in-situ in the pipes between the cement slurry used and other liquids therein, thereby obviating the need for preformed plugs, plug containers and other similar apparatus.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a sectional illustration of a pipe disposed in a subterranean well bore during the performance of a primary cementing procedure whereby a cement slurry separated from liquid drilling fluid by a fluid-separating plug of this invention is pumped through the pipe.

FIG. 2 is a sectional illustration similar to FIG. 1 but showing the pipe and well bore after drilling fluid has been displaced from within the pipe by the cement slurry and the fluid-separating plug has extruded through the float shoe at the bottom of the pipe.

FIG. 3 is a sectional illustration similar to FIG. 1 but showing the pipe and well bore after a second fluid-separating plug of this invention has been formed between the cement slurry and a displacement fluid, and after a portion of the cement slurry as well as the bottom plug has been displaced into the annulus between the pipe and the well bore.

FIG. 4 is a sectional illustration similar to FIG. 1 but showing the pipe and well bore after the top plug has landed on the -float shoe and the cement slurry has been displaced into the annulus.

FIG. 5 is a side cross-sectional view of the top end of a pipe to be cemented in a well bore having a pair of inflatable bladders suspended therein in accordance with this invention.

FIG. 6 is a cross-sectional view similar to FIG. 5 but showing the pipe after one of the inflatable bladders has been inflated to form a first plug therein and the pumping of a cement slurry into the pipe has begun.

FIG. 7 is a sectional illustration of the lower portion of the pipe of FIG. 6 which is disposed in a well bore after the inflated first plug of FIG. 6 has been displaced through and landed on the float shoe by the cement slurry pumped into the pipe.

FIG. 8 is a view similar to FIG. 6 but showing the pipe after the cement slurry has been pumped therein, the second bladder has been inflated to form a second plug and the pumping of a displacement fluid into the pipe has begun.

FIG. 9 is a sectional illustration of the bottom portion of the pipe of FIG. 8 disposed in a well bore after the second plug of FIG. 8 has been displaced to the bottom of the pipe and landed on the first plug and the cement slurry has been displaced into the annulus between the pipe and the well bore.

FIG. 10 is a cross-sectional view of the top end of a pipe disposed in a well bore having an alternate form of inflatable bladder apparatus disposed therein.

FIG. 11 is a cross-sectional illustration similar to FIG. 10 but showing the bottom inflatable bladder after it has been inflated and a first plug formed therefrom.

FIG. 12 is a cross-sectional illustration similar to FIG. 10 showing the pipe after the pumping of a cement slurry has begun and the first plug of FIG. 11 has been released.

FIG. 13 is a cross-sectional illustration similar to FIG. 10 showing the pipe after the top bladder has been inflated to form a second plug in the pipe and the second plug has been released as a result of displacement fluid being pumped into the pipe.

DESCRIPTION OF PREFERRED EMBODIMENTS

As mentioned above, the methods of the present invention can be used in any application where a first fluid is displaced through a pipe by a second fluid. The methods are particularly suitable for pipeline operations and performing cementing and other operations in the construction and repair of oil and gas wells. The fluid or fluids referred to herein as being displaced through a pipe or displacing another fluid through a pipe can be gases or liquids comprised of a single component, multiple components, solutions, dispersions or slurries.

The methods of the present invention are particularly suitable for displacing liquids through pipes disposed in well bores. For example, in the primary cementing of a pipe, e.g., casing, in a well bore, a cement slurry is pumped downwardly through the Wipe and then upwardly into the annulus between the external surfaces of the pipe and the walls of the well bore. After placement of the cement slurry in the annulus, it is allowed to set into a hard impermeable mass therein. The cement provides a bond between the pipe and the walls of the well bore to thereby maintain the pipe in place and prevent communication by way of the annulus between zones or formations which are penetrated by the well bore.

When primary cementing operations are carried out, both the well bore and the pipe to be cemented therein contain liquid drilling fluid. As the cement slurry is pumped through the pipe and into the annulus, it displaces the drilling fluid therefrom and out of the well bore at the surface. In order to prevent the cement slurry from mixing with the drilling fluid and becoming contaminated whereby it may fail to adequately bond the pipe to the walls of the well bore, a plug is generally utilized between the drilling fluid and the cement slurry. Also, once the quantity of cement slurry required for filling the annulus has been pumped into the pipe, it is displaced through the pipe with a displacement fluid, e.g., an aqueous solution, and a plug is placed between the cement slurry and the displacement fluid.

Heretofore, the plugs utilized have usually been formed of a hard resilient rubber material or the like and have been of a size and shape whereby the walls of the pipe are wiped by the plugs as they are displaced through the pipe. The pipe to be cemented includes a float shoe connected to the bottom end thereof which provides a landing surface for the plugs and includes a check valve which allows liquids to flow out of the pipe into the annulus between the pipe and the walls of the well bore but prevents reverse flow from the annulus into the pipe. Means have also been included in the float shoe and/or in the bottom plug whereby once it has landed on the float shoe, a passageway is opened whereby the cement slurry behind the plug is allowed to flow through or around the plug and into the annulus. A commonly used technique is to include a rupturable diaphragm across a passageway formed in the bottom plug which ruptures when the plug seats on the float shoe and the pressure exerted on the bottom plug is elevated to thereby allow the cement slurry to flow through the plug passageway, through the float shoe and into the annulus. The top plug, also formed of a solid resilient rubber material, has been of an integral construction which upon landing on the bottom plug seals the above referred to passageway. The resulting pressure increase provides an indication at the surface that the top plug has landed and that the cement slurry has been displaced into the annulus. Thereafter, the cement slurry is allowed to set in the annulus whereby the pipe is bonded in the well bore. The plugs, the set cement in the float shoe and the check valve and other internals of the float shoe are drilled out so that additional drilling, etc., can be commenced.

The physical placement of one or more preformed solid plugs in a pipe requires special apparatus which must be connected to the pipe and the operations of loading the plugs and releasing them into the pipe is often overly time consuming and expensive in that pumping must often be stopped for lengthy periods of time to perform the operations or confirm the release of the plugs.

The methods of the present invention eliminate the need for special plug containing and releasing apparatus or simplify such apparatus and its operation and minimize the time required for providing plugs in the pipe. In accordance with the methods of the present invention, instead of one or more preformed solid rubber plugs or the like being placed into the pipe, one or more fluid-separating plugs are formed in-situ in the pipe. That is, a fluid-separating plug is formed between first and second fluids in a pipe by injecting a self-thickening liquid therein and permitting the liquid to thicken into a plug prior to displacing the plug and the first fluid with the second fluid.

The self-thickening liquid which can be utilized in accordance with the present invention can be any liquid composition which, upon being injected into the pipe, substantially immediately thickens into a fluid-separating mass which is inert to and non-reactive with the separated fluids and which does not adhere to the walls of the pipe. A suitable such self-thickening liquid composition is comprised of a solution or dispersion of a natural or synthetic polymer and a cross-linking agent for the polymer which thickens after being injected into the pipe as a result of the polymer being cross-linked by the cross-linking agent. An example of such a self-thickening liquid is an aqueous solution comprised of a hydratable polymer and a cross-linking agent for the polymer. Examples of water soluble polysaccharide polymers which can be used include naturally occurring galactomannan gums derived from various endosperms of seeds. Such gums hydrate and form thick, highly viscous solutions in water. Examples are tara gum, locust bean gum, guar gum, paloverde gum, honey locust gum, Japanese pagoda gum, indigo gum and the like. Such galactomannan gums and derivatives thereof, e.g., hydroxypropylguar, are commercially available in solid particulate form. Synthetic polymers can also be utilized which rapidly hydrate in water such as hydratable cellulose derivatives, e.g., hydroxyethylcellulose, carboxymethylcellulose, carboxymethylhydroxyethylcellulose and methylcellulose. Other hydratable synthetic polymers such as polyacrylamide and polymethacrylamide can also be utilized.

When natural and synthetic polymers of the type described above are dispersed in an aqueous media and hydrated, they form viscous gels. In order to further stiffen the gels so that a cohesive rigid gel having the ability to maintain the separation of fluids is formed, a cross-linking agent for the polymer utilized is included in the self-thickening liquid composition. Cross-linking agents which can be utilized include water soluble organo-metallic compounds, borate compounds and compounds which contain and release polyvalent metal ions. A particularly preferred self-thickening liquid composition containing a polysaccharide polymer and a cross-linking agent therefor is comprised of water, a high molecular weight, hydratable viscosifying polymer present in the composition in an amount in the range of from about 0.2% to about 2% by weight of the composition and an organo-metallic cross-linking agent present in the composition in an amount in the range of from about 10 ppm to about 200 ppm of the composition. Upon the hydration and cross-linking of the polymer in the composition, a stiff gel capable of functioning as a fluid-separating displacement plug in a pipe is formed. Such a hydrated cross-linked polysaccharide polymer plug is particularly suitable for use between liquid drilling fluid and a cement slurry in performing primary well cementing in that the plug can be extruded through the float shoe into the annulus to be cemented whereby it continues to maintain a separation between the drilling fluid and cement slurry as they flow into the annulus. In the use of a self-thickening liquid composition containing a hydratable polymer and a cross-linking agent in accordance with this invention, the polymer can be prehydrated in a water solution and the cross-linking agent added to the solution just prior to injecting it into a pipe. The injected composition will cross-link and form a plug substantially immediately.

Another particularly suitable self-thickening liquid composition for use in forming a fluid-separating plug in accordance with this invention is comprised of a suspension of a natural or synthetic rubber and a vulcanizing agent therefor which thickens after being injected into a pipe as a result of the rubber being vulcanized by the vulcanizing agent.

Such a vulcanizable rubber composition is generally comprised of an aqueous dispersion or emulsion of rubber, a vulcanizing agent and a vulcanization activator. Other additives can be included in the composition to control the viscosity of the composition prior to vulcanization, to accelerate the time in which vulcanization takes place and to change the properties of the vulcanized rubber plug formed whereby such properties are best suited for the particular application and environment to which the plug is subjected.

A variety of well known rubber materials can be utilized for forming the self-thickening compositions useful in accordance with the present invention. For example, natural rubber (cis-1,4-polyisoprene) in most of its modified types can be utilized. Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis/trans-1,4-polyisoprene rubber, silicone rubber, chlorosulfonated polyethylene rubber, cross-linked polyethylene rubber, epichlorohydrin rubber, fluorocarbon rubber, fluorosilicone rubber, polyurethane rubber, polyacrylic rubber and polysulfide rubber. The rubber materials are commercially available in latex form, i.e., aqueous suspensions which can be utilized directly and to which the other components of the vulcanizable rubber compositions can be added.

Of the various rubber materials which can be utilized, natural rubber, cis-polyisoprene rubber, nitrile rubber, ethylene-propylene rubber, styrene-butadiene rubber, butyl rubber and neoprene rubber are generally preferred.

Vulcanization of the rubber is the process that converts the rubber latex to a solid elastic and resilient state. The vulcanization process involves the cross-linking of the polymer chains and can be accomplished by incorporating one or more vulcanizing agents in the rubber composition. The most common vulcanizing agent which can be utilized with a majority of the rubber materials described above is sulfur. Other compounds that can be used either with or without sulfur are organic peroxide compounds, azo compounds, phenolic curatives, benzoquinone derivatives, bismaleimides, selenium, tellurium, nitro compounds, resins, metal oxides, and organic sulfur compounds such as alkylthiuram disulfides.

The rate of vulcanization increases exponentially with increases in temperature, and the time required for the vulcanization of a particular rubber latex composition can be varied over a wide range by the selection of a particular vulcanizing agent and other additives. In order to initiate the vulcanization, a vulcanization activator is generally included in the rubber latex composition. Particularly suitable vulcanization activators are fatty acids such as stearic acid, metallic oxides such as zinc oxide and mixtures of such compounds.

In order to shorten the vulcanization time beyond that obtainable by the selection of vulcanizing agents alone, a vulcanization accelerator can be included in the rubber composition. Such accelerators generally function to initiate free radicals and they are preferably selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

An example of a vulcanizable rubber latex composition which includes natural rubber and which will vulcanize to form a solid rubber within a relatively short period of time after being injected into a pipe at the temperatures normally encountered is a pumpable aqueous dispersion comprised of 167 parts by weight natural rubber latex, 3 parts by weight sodium alkyl sulfate, 2.75 parts by weight sulfur vulcanizing agent, a vulcanization activator consisting of 8 to 10 parts by weight zinc oxide, a vulcanization accelerator mixture comprised of 4 parts by weight 2,2'-dithiobisbenzothiazole and 0.4 part by weight tetramethylthiuram disulfide, and a mineral filler comprised of 200 parts by weight hydrated aluminum silicate.

An example of a cis-polyisoprene rubber latex composition which will vulcanize into a solid rubber mass is a pumpable aqueous dispersion comprised of 167 parts by weight cis-polyisoprene latex, 3 parts by weight sodium alkyl sulfate, a vulcanizing agent comprised of 1.5 to 3 parts by weight sulfur, an activator mixture consisting of 8 to 10 parts by weight zinc oxide, an accelerator mixture comprised of 2 to 4 parts by weight n-cyclohexyl-benzothiazole-2-sulfenamide and 0.2 to 0.6 parts by weight tetramethylthiuram monosulfide, and 150 parts by weight hydrated aluminum silicate.

An example of a nitrile rubber latex composition which will vulcanize into a solid rubber mass is a pumpable aqueous dispersion comprised of 150 parts by weight nitrile rubber latex, 2 parts by weight potassium hydroxide, 1.75 parts by weight of sulfur vulcanizing agent, an activator consisting of 8 to 10 parts by weight zinc oxide, an accelerator mixture comprised of 4.5 parts by weight 2,2'-dithiobisbenzothiazole and 0.3 parts by weight tetramethylthiuram disulfide, and 80 parts by weight carbon black.

An example of an ethylene-propylene rubber latex composition which will vulcanize into a solid rubber mass is a pumpable aqueous dispersion comprised of 200 parts by weight ethylene-propylene rubber latex, 1 part by weight sodium alkyl sulfate a vulcanizing agent mixture comprised of 6 to 8 parts by weight of a 50 percent active blend of 2,5-bis(tert-butylperoxy)- 2,5-dimethylhexane in an inert mineral carrier and 0.32 parts by weight sulfur, and an activator consisting of 8 to 10 parts by weight zinc oxide, and 100 parts by weight carbon black.

An example of a styrene-butadiene rubber latex composition which will vulcanize into a solid rubber mass is a pumpable aqueous dispersion comprised of 200 parts by weight styrene-butadiene rubber latex, 2 parts by weight sodium alkyl sulfate, 2 parts by weight sulfur vulcanizing agent, an activator mixture comprised of 5 parts by weight zinc oxide and 12 parts by weight magnesia, an accelerator mixture comprised of 3.0 parts by weight 2,2'-dithiobisbenzothiazole and 0.2 part by weight of copper dimethyldithiocarbamate, and a mineral filler comprised of 125 parts by weight hydrous magnesium calcium silicate.

An example of a butyl rubber latex composition is a pumpable aqueous dispersion comprised of 160 parts by weight butyl rubber latex, 3 parts by weight sodium alkyl sulfate, 3 parts by weight sulfur vulcanizing agent, an activator consisting of 5 parts by weight zinc oxide and an accelerator mixture comprised of 2.0 parts by weight 2-mercaptobenzothiazole, 4 parts by weight tetramethylthiuram disulfide and 4 parts by weight tellurium diethyldithiocarbamate.

An example of a neoprene rubber latex composition is a pumpable aqueous dispersion comprised of 200 parts by weight neoprene rubber latex, 3 parts by weight sodium alkyl sulfate a vulcanizing agent mixture comprised of 4 parts by weight magnesia and 5 parts by weight zinc oxide and a modifier consisting of 4.0 parts by weight 2,2'-dithiobisbenzothiazole.

Test samples of one or more of the above described compositions having desired properties can be prepared and tested at the particular temperatures and other conditions to be encountered in a particular pipeline or well application to thereby determine the time required for the composition to vulcanize into a solid rubber mass, the properties of the composition prior to vulcanization and the properties of the vulcanized rubber formed therefrom and other variables. The quantities of the various components in the compositions can be varied to produce the desired results.

In forming a fluid-separating plug in a pipe using the self-thickening liquid compositions described above, the self-thickening composition used can be injected directly into the pipe through a small valved connection therein. A quantity is used which is sufficient to fill from about 2 feet to about 10 feet of the pipe with the composition. Once the composition has cross-linked or vulcanized into a highly stiff gel or rubber, the plug and the fluid contained in the pipe ahead of the plug are displaced through the pipe with a displacement fluid.

The stiff gel and rubber compositions described above are particularly suitable for performing primary well cementing operations. Referring to the drawings, and particularly to FIGS. 1–4, the various steps utilized in primary cementing using the in-situ formed fluid-separating plugs of this invention are illustrated. That is, referring to FIG. 1, a well bore 10 is shown having a pipe 12 suspended therein. Both the pipe 12 and well bore 10 contain liquid drilling fluid 14, and as shown in FIG. 1, a liquid-separating plug 16 is formed in the pipe 12 between the liquid drilling fluid 14 therein and a cement slurry 18 pumped into the pipe 12. The liquid-separating plug 16 is formed in-situ by injecting a first self-thickening liquid therein and permitting the liquid to thicken into the first plug 16. As mentioned above, various self-thickening liquid compositions can be utilized for forming the plug 16, but the self-thickening liquid is preferably an aqueous solution of a hydratable polymer and a cross-linking agent therefor. The polymer is hydrated and then cross-linked by the cross-linking agent whereby it forms a cohesive stiff gel which can be extruded through the float shoe 20 connected to the bottom end of the pipe 12. The design and use of float shoes for primary cementing are well known to those skilled in the art, and as shown in FIGS. 1–4 they include an upwardly facing seating surface 22 for landing plugs and a check valve 24 for preventing the back flow of liquids from the well bore into the interior of the pipe 12.

As shown in FIGS. 2 and 3, the continued pumping of the cement slurry 18 causes the first plug 16 to be extruded through the float shoe 20 and enter the annulus between the exterior of the pipe 12 and the walls of the well bore 10 wherein it continues to separate the liquid drilling fluid and cement slurry.

As shown in FIG. 3, a second liquid-separating plug 26 is formed in the pipe 12 between the cement slurry 18 and a displacement fluid 28, e.g., an aqueous solution, therein. As mentioned above, the second plug is formed in-situ in the pipe 12 by injecting a second self-thickening liquid therein and permitting the liquid to thicken. The self-thickening liquid utilized for forming the second plug 26 is preferably comprised of a suspension of a natural or synthetic rubber and a vulcanizing agent therefor which thickens into a firm resilient rubber plug.

As shown in FIG. 4, the displacement fluid 28 is pumped into the pipe 20 until the plug 26 lands on the seating surface 22 of the float shoe 20 whereupon the displacement is discontinued. When the rigid rubber plug 26 lands on the float shoe 20, it prevents fluid from flowing through the float shoe 20 and causes a pressure increase which provides a signal that the cement slurry has been displaced into the annulus and that the displacement should be terminated. The cement slurry is permitted to set in the annulus whereby the pipe 12 is bonded therein, and the plug 26 and float shoe 20 are subsequently drilled out.

Thus, the methods of the present invention allow liquid separating plugs to be quickly and efficiently formed in-situ within the pipe being cemented, the bottom plug extrudes through the float shoe which obviates the use of special apparatus and/or steps to open the plug or float shoe once the first plug reaches it and the second plug is easily drilled after the cement slurry has set. The methods of the present invention also obviate the need for special plug containers and releasing apparatus and are therefore more efficient and less expensive to utilize.

Referring now to FIGS. 5–9, apparatus for carrying out an alternate embodiment of the methods of the present invention is illustrated. In this embodiment of the present invention, first and second inflatable bladders 30 and 32, respectively, formed of rubber or plastic material are suspended in the top end of a pipe 34 which is disposed in a well bore 36 (FIG. 7). The inflatable bladders 30 and 32 are attached to hoses 38 and 40, respectively, which are in turn attached to inflating connectors 42 and 44 sealingly attached to a pipe cap 46. The pipe cap 46 is sealingly connected to the top of the pipe 34, and an inlet pipe 48 is connected through the cap 46 for introducing a cement slurry and displacement fluid into the pipe. When inflated with an inflating fluid, the bladders 30 and 32 form liquid-separating and pipe wiping plugs as will be described below. The use of the bladders 30 and 32 insure that the plugs produced therefrom are of predetermined proper size and shape for achieving excellent fluid separation and pipe wiping. Also, the bladders can be installed in the pipe when the pipe is suspended in the well bore and utilized as required at later times to immediately form fluid-separating plugs therefrom.

As shown in FIG. 6, when inflated, the bottom bladder 30 forms a plug 50 which includes a passageway 52 closed by a rupturable diaphragm 54, and which includes resilient pipe wiping ribs 56 around the outer periphery thereof. The bladders 30 and 32 can be inflated with any suitable inflating fluid such as a gas, liquid or self-thickening liquid. The inflating fluid used is pumped into the bladders 30 and 32 by way of the hoses 38 and 40 and fill connections 42 and 44.

Check valves are included in the bladders (not shown) whereby reverse flow is prevented. Preferably, the inflating fluid used for inflating the bladders 30 and 32 is a self-thickening liquid, and most preferably, a self-thickening rubber composition which thickens into a resilient rubber mass within the bladders.

Referring still to FIG. 6, the bladder 30 is inflated with a self-thickening rubber composition so that it forms a liquid-separating plug 50 positioned between liquid drilling fluid 58 contained in the pipe 34 and a cement slurry 60 pumped into the pipe 34 above the plug 50. As shown in FIG. 7, the continued pumping of the cement slurry 60 causes the plug 50 to break away from the hose 38 and to be displaced downwardly within the pipe 34 until it has landed on the float shoe 62 connected at the bottom end of the pipe 34. Once seated, the continued pumping of the cement slurry 60 causes the diaphragm 54 in the plug 50 to rupture to thus permit the cement slurry to flow through the passageway 52, through the float shoe 62, and into the annulus between the pipe 34 and the well bore 36.

As shown in FIG. 8, once the required quantity of cement slurry has been pumped into the pipe 34, the bladder 32 is inflated with a liquid rubber composition whereby a second liquid-separating plug 64 is formed within the pipe 34. Once the plug 64 is formed, a displacement fluid 66 is pumped into the pipe 34 by way of the conduit 48 whereby the hose 40 is broken and the plug 64 and cement slurry 60 are displaced downwardly. As shown in FIG. 9, the displacement of the plug 64 and the cement slurry 60 is continued until the plug 64 lands on the plug 50 and causes a pressure increase. At that point, the displacement is terminated and the cement slurry 60 is allowed to set into a hard mass within the annulus between the pipe 34 and the walls of the well bore 36. After the cement slurry has set, the plugs 50 and 64 and the float shoe 62 is drilled out.

Referring now to FIGS. 10–13, yet another form of apparatus for carrying out the methods of the present invention is- illustrated. As shown in FIG. 10, the apparatus includes a pipe cap 70 which is sealingly attached to the end of a pipe 72. The pipe 72 can be a vertically positioned pipe to be cemented in a well bore as described above, or the pipe 72 can be a vertically or horizontally positioned plug container connected to a pipeline or the like. Sealingly connected through the pipe cap 70 is an inlet conduit 74. Connected to the internal end of the conduit 74 by a breakable connector 76 is a conduit 78 having an inflatable bladder 80 attached thereto. Connected to the conduit 78 by a second breakable connector 81 is a second conduit 82 having an inflatable bladder 84 attached thereto. The conduit 78 includes an internal seat 86 for sealingly receiving a relatively large diameter shut-off ball, and the conduit 82 includes an internal seat 88 for receiving a small diameter shut-off ball. The bladders 80 and 84 are connected to inflating hoses 90 and 92, respectively, which are in turn connected to inflating connectors 94 and 96, respectively, sealingly attached through the pipe cap 70.

Referring to FIG. 11, the bladder 84 is inflated with an inflating fluid, preferably a liquid rubber composition, whereby it forms a fluid-separating plug 100 within the pipe 72. The plug 100 separates a first fluid 102 contained within the pipe 72, e.g., liquid drilling fluid, from a second fluid 104, e.g., a cement slurry, pumped through the conduit 74. A small diameter sealing ball 106 is pumped through the conduit 74 and through the conduits 78 and 82 connected thereto ahead of the second fluid 104. As will be understood, the small diameter ball 106 passes through the large diameter seating surface 86 contained within the conduit 78, but sealingly seats on the small diameter seating surface 88 within the conduit 82. The seating of the ball 106 on the seating surface 88 and continued pumping of the second fluid 104 causes the breakable connector 81 to which the conduit 82 is attached to break as shown in FIG. 12. As a result, the plug 100 formed from the bladder 84 is displaced along with the first fluid 102 through the pipe 72 by the second fluid 104.

As shown in FIG. 13, when the required quantity of the second fluid 104 has been displaced through the pipe 72, the bladder 80 is inflated to form a second plug 108. Once the plug 108 has been formed, a displacement fluid 110 is pumped through the conduit 74 into the pipe 72. A large diameter ball 112 is pumped through the conduit 74 ahead of the displacement fluid 110 which sealingly seats on the seating surface 86 within the conduit 78. The sealing of the conduit 78 by the ball 112 and seating surface 86 therein along with the continued pumping of the displacement fluid 110 causes the connector 76 between the conduits 74 and 86 to break as shown in FIG. 13. As a result, the plug 108 is displaced along with the fluid 104 through the pipe 72 by the displacement fluid 110.

As mentioned above, while any suitable inflating fluid can be utilized to inflate the bladders 30, 32, 80 and 84 described above, a self-thickening liquid rubber composition which immediately sets within the bladders after they are inflated therewith is preferred. The resulting integral resilient rubber plugs which include peripheral resilient wiping ribs function extremely well in maintaining fluid separation and wiping the walls of the pipe while requiring a minimum of time and expense to form and launch.

In order to further illustrate the methods of the present invention the following example is given.

EXAMPLE 8200 feet of 7⅝" diameter casing are suspended in a 9½" diameter well bore, and the well bore and casing are filled with a potassium chloride-partially hydrolyzed polyacrylamide drilling fluid. A first fluid-separating plug is formed in-situ in the casing by injecting a self-thickening liquid composition therein comprised of water, guar gum present in the composition in an amount of about 1.0% by weight of the composition and a cross-linking agent comprised of titanium triethanolamine present in the composition in an amount of about 100 ppm of the composition. The pH of the composition is about 7, and the viscosity of the composition before crosslinking is about 80 to 100 centipoises. The guar gum is prehydrated by dissolving it in the water and after the cross-linking agent is added, the self-thickening composition is injected into the casing in an amount of about 10 gallons whereby a stiff gel plug having a length of about 5 feet is formed within the casing. After injection, the stiff gel is formed in about 30 seconds.

A cement slurry comprised of Portland API Class H cement, an organic polymer (cellulose) fluid loss control additive in an amount of about 0.8% by weight of cement, a calcium lignosulfonate set retarding additive in an amount of about 0.3% by weight of cement and sufficient water to form a pumpable slurry is pumped into the casing. The cement slurry is continuously pumped until the required quantity for filling the annulus between the casing and the well bore is pumped, i.e., a quantity of about 295 barrels of cement slurry.

A second fluid-separating plug is formed in-situ in the pipe by injecting a self-thickening rubber composition there-into. That is, a liquid rubber composition comprised of about 200 parts by weight of a styrene-butadiene (25:75) rubber latex, 2 parts by weight sodium alkyl sulfate about 2 parts by weight of a sulfur vulcanizing agent, a vulcanization activator mixture comprised of 5 parts by weight zinc oxide and 10 parts by weight magnesia, a vulcanization accelerator comprised of 4 parts by weight aqueous dithiocarbamate and 200 parts by weight hydrated amorphous silica. Six gallons of the liquid rubber latex composition are injected into the casing to form a plug therein about 3 feet long. Within about 0.5 minutes after-injection, the rubber latex composition thickens into a resilient solid rubber plug.

A displacement fluid comprised of an aqueous potassium chloride-partially hydrolyzed polyacrylamide solution is next pumped into the casing and the second plug and cement slurry are displaced through the casing whereby the first plug formed of stiff gel is extruded through the float shoe attached at the bottom of the casing, the cement slurry is displaced into the annulus between the casing and the well bore and the second rubber plug is landed on the float shoe. When the second rubber plug lands on the float shoe a pressure increase is..observed which signals that the pumping should be stopped and that the cement slurry has been displaced into the annulus.

The cement slurry is permitted to set into a hard mass in the annulus for 24 hours whereby the casing is bonded in the well bore, and the second rubber plug, and set cement within the float shoe are drilled out.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. In a method of displacing a first liquid through a pipe with a second liquid while preventing the first and second liquids from mixing wherein a solid plug for separating the first and second liquids is placed in the pipe and then the plug and the first liquid are displaced through the pipe with the second liquid, the improvement which comprises forming said plug in-situ in said pipe between said first and second liquids by injecting a self-thickening liquid therein and permitting said liquid to thicken into a liquid-separating plug prior to displacing said plug and said first liquid with said second liquid, wherein said self-thickening liquid is comprised of a suspension of a natural or synthetic rubber and a vulcanizing agent therefor which thickens after being injected into said pipe as a result of said rubber being vulcanized by said vulcanizing agent.

2. The method of claim 1 wherein said self-thickening liquid is comprised of an aqueous suspension of a natural or synthetic rubber, a vulcanizing agent and a vulcanization activator.

3. The method of claim 2 wherein said rubber is selected from the group consisting of natural rubber, cis-polyisoprene rubber, nitrile rubber, ethylene-propylene rubber, styrene-butadiene rubber, butyl rubber and neoprene rubber.

4. The method of claim 2 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

5. The method of claim 2 wherein said vulcanization activator is selected from the group consisting of fatty acids, metallic oxide compounds and mixtures of such compounds.

6. The method of claim 1 wherein said rubber is selected from the group consisting of natural rubber, cis-polyisoprene rubber, nitrile rubber, ethylene-propylene rubber, styrene-butadiene rubber, butyl rubber and neoprene rubber.

7. The method of claim 1 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

8. In a method of displacing a first liquid through a pipe with a second liquid while preventing the first and second liquids from mixing wherein a solid plug for separating the first and second liquids is placed in the pipe and then the plug and the first liquid are displaced through the pipe with the second liquid, the improvement which comprises forming said plug in-situ in said pipe between said first and second liquids by injecting a self-thickening liquid therein and permitting said liquid to thicken into a liquid-separating plug prior to displacing said plug and said first liquid with said second liquid, wherein said self-thickening liquid is comprised of an aqueous suspension of a natural or synthetic rubber, a vulcanizing agent and a vulcanization activator.

9. The method of claim 8 wherein said rubber is selected from the group consisting of natural rubber, cis-polyisoprene rubber, nitrile rubber, ethylene-propylene rubber, styrene-butadiene rubber, butyl rubber and neoprene rubber.

10. The method of claim 8 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

11. The method of claim 8 wherein said vulcanization activator is selected from the group consisting of fatty acids, metallic oxide compounds and mixtures of such compounds.

12. In a method of displacing a first liquid through a pipe with a second liquid while preventing the first and second liquids from mixing wherein a solid plug for separating the first and second liquids is placed in the pipe and then the plug and the first liquid are displaced through the pipe with the second liquid, the improvement which comprises forming said plug in-situ in said pipe between said first and second liquids by injecting a self-thickening liquid therein and permitting said liquid to thicken into a liquid-separating plug prior to displacing said plug and said first liquid with said second liquid, wherein said self-thickening liquid is comprised of a suspension of a natural or synthetic rubber and a vulcanizing agent;

wherein said rubber is selected from the group consisting of natural rubber, cis-polyisoprene rubber, nitrile rubber, ethylene-propylene rubber, styrene-butadiene rubber, butyl rubber and neoprene rubber; and wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

13. The method of claim 12 wherein said self-thickening liquid includes a vulcanization activator selected from the group consisting of fatty acids, metallic oxide compounds and mixtures of such compounds.

* * * * *